United States Patent
Li et al.

(10) Patent No.: US 12,109,735 B2
(45) Date of Patent: Oct. 8, 2024

(54) CONSTRUCTION OF CONFORMAL COOLING CHANNELS FOR INJECTION MOLD DESIGNS

(71) Applicant: Siemens Industry Software Inc., Plano, TX (US)

(72) Inventors: Zhi Li, Cypress, CA (US); Liwen Wang, Shanghai (CN); Chee-keong Chong, Irvine, CA (US); Shunshun Zhou, Chengdu (CN)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 18/681,341

(22) PCT Filed: Aug. 27, 2021

(86) PCT No.: PCT/CN2021/114882
§ 371 (c)(1),
(2) Date: Feb. 5, 2024

(87) PCT Pub. No.: WO2023/024052
PCT Pub. Date: Mar. 2, 2023

(65) Prior Publication Data
US 2024/0262017 A1   Aug. 8, 2024

(51) Int. Cl.
| | |
|---|---|
| *G06F 30/13* | (2020.01) |
| *B29C 33/38* | (2006.01) |
| *B29C 45/73* | (2006.01) |
| *B29C 64/386* | (2017.01) |
| *B33Y 50/00* | (2015.01) |
| *B33Y 80/00* | (2015.01) |

(52) U.S. Cl.
CPC ...... *B29C 33/3842* (2013.01); *B29C 45/7312* (2013.01); *B29C 64/386* (2017.08); *B33Y 50/00* (2014.12); *B33Y 80/00* (2014.12)

(58) Field of Classification Search
CPC .............. B29C 33/3842; B29C 64/386; B29C 45/7312; B33Y 80/00; B33Y 50/00
USPC .......................................................... 703/1
See application file for complete search history.

(56) References Cited

U.S. PATENT DOCUMENTS

| | | | |
|---|---|---|---|
| 2004/0128016 A1* | 7/2004 | Stewart .............. | G05B 19/4099 700/159 |
| 2019/0111590 A1* | 4/2019 | Trivedi .............. | B29C 33/3835 |
| 2019/0263039 A1* | 8/2019 | Stagon .................. | B33Y 10/00 |

FOREIGN PATENT DOCUMENTS

| | | |
|---|---|---|
| CN | 108407222 A | 8/2018 |
| CN | 108819152 A | 11/2018 |

(Continued)

*Primary Examiner* — Andre Pierre Louis (57) ABSTRACT

A computing system may include a design access engine configured to access an injection mold design and a channel construction engine configured to construct conformal cooling channels for the injection mold design. The channel construction engine may do so by extracting a cooling surface of the injection mold design, generating a central offset surface with a same shape as the cooling surface, projecting cooling lines on to the central offset surface, detecting sharp portions of the projected cooling lines, smoothing the detected sharp portions of the projected cooling lines, and generating the conformal cooling channels using the smoothed cooling lines along the central offset surface as a center line for the conformal cooling channels.

20 Claims, 8 Drawing Sheets

(56) References Cited

FOREIGN PATENT DOCUMENTS

CN         111444619 A     7/2020
EP          3666493 A1     6/2020

* cited by examiner

CONSTRUCTION OF CONFORMAL COOLING CHANNELS FOR INJECTION MOLD DESIGNS

TECHNICAL FIELD

This application is generally related to injection mold designs, and, more specifically, to construction of conformal cooling channels for injection mold designs.

BACKGROUND

Computer systems can be used to create, use, and manage data for products, items, and other objects. Examples of computer systems include computer-aided design (CAD) systems (which may include computer-aided engineering (CAE) systems), visualization and manufacturing systems, product data management (PDM) systems, product lifecycle management (PLM) systems, and more. These systems may include components that facilitate the design, visualization, and simulated testing of product structures and product manufacture.

SUMMARY

According to an aspect of the invention, there is provided a method, comprising: by a computing system: accessing an injection mold design; constructing conformal cooling channels for the injection mold design, including by: extracting a cooling surface of the injection mold design, wherein the cooling surface corresponds to specified portions of the injection mold design to be cooled through the conformal cooling channels; generating a central offset surface positioned at a central offset distance from the cooling surface; projecting cooling lines on to the central offset surface; detecting sharp portions of the projected cooling lines based on sharpness criteria; smoothing the detected sharp portions of the projected cooling lines to form smoothed cooling lines; and generating the conformal cooling channels using the smoothed cooling lines along the central offset surface as a center line for the conformal cooling channels; and providing the injection mold design that includes the constructed conformal cooling channels for physical manufacture through an additive manufacturing process.

According to another aspect of the invention, there is provided a computing system comprising: a design access engine configured to access an injection mold design; and a channel construction engine configured to: construct conformal cooling channels for the injection mold design, including by: extracting a cooling surface of the injection mold design, wherein the cooling surface corresponds to specified portions of the injection mold design to be cooled through the conformal cooling channels; generating a central offset surface positioned at a central offset distance from the cooling surface; projecting cooling lines on to the central offset surface; detecting sharp portions of the projected cooling lines based on sharpness criteria; smoothing the detected sharp portions of the projected cooling lines to form smoothed cooling lines; and generating the conformal cooling channels using the smoothed cooling lines along the central offset surface as a center line for the conformal cooling channels; and provide the injection mold design that includes the constructed conformal cooling channels for physical manufacture through an additive manufacturing process.

According to a further aspect of the invention, there is provided a non-transitory machine-readable medium comprising instructions that, when executed by a processor, cause a computing system to perform a method according to the present invention.

BRIEF DESCRIPTION OF THE DRAWINGS

Certain examples are described in the following detailed description and in reference to the drawings.

DETAILED DESCRIPTION

Injection mold production may include processes in which a product is manufactured by injecting liquid (e.g., melted liquid plastic or molten plastic) into an injection mold, which then cools into the form of a solid product as shaped by the injection mold. In that regard, an injection mold may define or comprise a cavity that sets the shape, topology, structure, or various other physical characteristics of products constructed through injection mold productions. In some implementations, injection molds are formed by multiple mold pieces, sometimes referred to as (or including) design cores, cavities, or inserts. When these multiple mold pieces are aligned or combined together, an internal space of the injection mold is formed that thus defines the solid shape that the injected liquid plastic will cool into. As such, injection molds (and the mold pieces that comprise the injection molds) may include internal surfaces that, in effect, define a mold cavity and product shape for injection mold production processes.

Modern injection mold productions may be an efficient process to construct products quickly and in customized shapes, dimensions, and characteristics as defined by injection molds. Product cooling is an important component of injection mold productions, and injection mold designs can include cooling channels proximate to cavity surfaces through which coolant fluid is pumped in order to cool injected liquid plastic. Conventional cooling channels have been implemented as straight lines, which can be readily machined by drill tools into physical injection molds (and pieces thereof). Such basic implementation of cooling channels can lead to product defects, as straight cooling channels will necessarily cool different portions of part surfaces at different rates. As some portions of a product surface (e.g., as defined by the injection mold) may be closer in distance to straight cooling channels than other portions, uneven cooling, part warping, and other undesired effects may arise.

Conformal cooling channels can improve the productivity of injection mold productions and plastic product quality by providing consistent cooling capabilities for injection mold productions. As used herein, conformal cooling channels may refer to any channels in an injection mold that track, at least in part, a product shape or surface topology defined by an injection mold. Conformal cooling channels may conform to the surface topology of a product, e.g., by spacing the cooling channels at a uniform distance from product surfaces, and may thus increase uniformity in cooling of product surfaces constructed via injection molds. In that regard, conformal cooling channels may be customized specific to a particular product defined by a particular injection mold, and provide the possibility of uniform, effective, and efficient cooling for products generated through injection molds of any particular type, shape, or structure. Uniform cooling of mold surface areas via conformal cooling channels can reduce plastic shrinkage to avoid warpage in manufactured products.

Modern advances in additive manufacturing (sometimes referred to as 3-dimensional or 3D printing) have increased the viability of conformal cooling channels in injection molds. Through increasing additive manufacturing capabilities, manufacture of arbitrary and complex product designs, including injection molds with customized conformal cooling channels, has become increasingly possible. Even with such advances in manufacturing capability, the design of conformal cooling channels has become a bottleneck in injection mold productions. As conformal cooling channels can be customized based on product shape, each individual injection mold may require a separately-designed conformal cooling channel structure that is tailored to a specific injection mold (and pieces thereof).

Manual design of conformal cooling channels to track the surface topology for injection mold pieces can be tedious and error-prone. Some existing techniques allow CAD application users to specify individual points along a cooling path for an injection mold, by which channels can then be created. However, even such point-based path specification techniques can be time-consuming and may still result in conformal cooling channels that are inconsistently distanced from injection mold cavity surfaces and one another, as user error can introduced through manual point definitions. Such limitations may result in cooling channel designs marred by non-uniform product cooling, plastic warping, or that otherwise cause noticeable product deficiencies.

The disclosure herein may provide systems, methods, devices, and logic for construction of conformal cooling channels for injection mold designs.

The conformal cooling channel construction technology described herein may provide capabilities to construct conformal cooling channels for injection molds with enforced characteristics, such as uniform distances between constructed cooling channels and injection mold surfaces. For instance, the conformal cooling channel construction technology described herein may support shape extractions of injection mold surfaces and generation of central offset surfaces with a same shape as the extracted mold surfaces. As used herein, a "same" shape may refer to any identical or approximate topology, which may be generated and evaluated in various ways as described herein. By positioning central offset surfaces at a specified distance from the mold surfaces and projecting cooling lines onto the central offset surfaces, the conformal cooling channel construction technology of the present disclosure may ensure constructed cooling channels appropriately conform to surface topologies of the injection mold while also uniformly spaced from the mold surfaces (and thus product surfaces defined by the mold surfaces).

Additionally or alternatively, the conformal cooling channel construction technology presented herein may include capabilities to detect sharp portions of projected cooling lines. Such sharp portions may prevent proper 3D printing of the cooling channels in injection molds or may cause coolant backups or otherwise limit coolant flow such that the effectiveness of injection mold cooling processes is (at times drastically) reduced. As such, detection and smoothing of such sharp portions in projected cooling lines may increase the efficacy in the manufacture and operation of injection mold productions. In these ways and more, the conformal cooling channel construction technology presented herein may improve the efficiency and efficacy in the design, manufacture, and operation of injection molds.

These and other conformal cooling channel construction features and technical benefits are described in greater detail herein.

Figure 1:
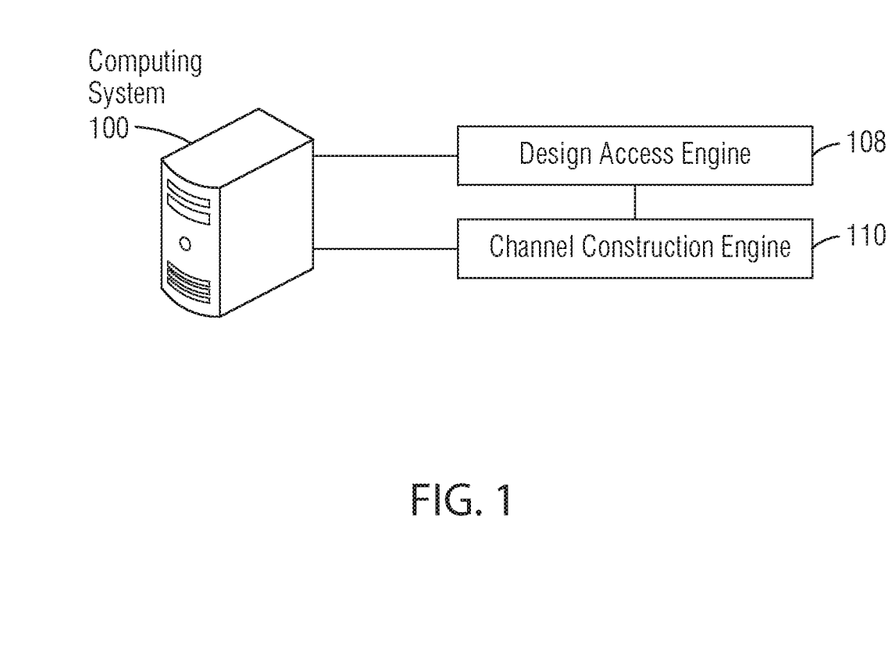
FIG. 1 shows an example of a computing system that supports construction of conformal cooling channels for injection mold designs.

FIG. 1 shows an example of a computing system 100 that supports construction of conformal cooling channels for injection mold designs. The computing system 100 may take the form of a single or multiple computing devices such as application servers, compute nodes, desktop or laptop computers, smart phones or other mobile devices, tablet devices, embedded controllers, and more. In some implementations, the computing system 100 hosts, supports, executes, or implements a CAD application that supports generation of injection mold designs, including through construction of conformal cooling channels.

As an example implementation to support any combination of the conformal cooling channel construction features described herein, the computing system 100 shown in FIG. 1 includes a design access engine 108 and a channel construction engine 110. The computing system 100 may implement the engines 108 and 110 (including components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the computing system 100 implements multiple engines using the same computing system features or hardware components (e.g., a common processor or a common storage medium).

In operation, the design access engine 108 may access an injection mold design. In operation, the channel construction engine 110 may construct conformal cooling channels for the injection mold design. The channel construction engine 110 may do so by extracting a cooling surface of the injection mold (wherein the cooling surface may correspond to specified portions of the injection mold design to be cooled through the conformal cooling channels), by generating a central offset surface with a same shape as the cooling surface and positioned at a central offset distance from the cooling surface, and by projecting cooling lines along the central offset surface. The channel construction engine 110 may further construct the conformal cooling channels by detecting sharp portions of the projected cooling lines based on sharpness criteria, by smoothing the detected sharp portions of the projected cooling lines to form smoothed cooling lines, and by generating the conformal cooling channels using the smoothed cooling lines along the central offset surface as a center line for the conformal cooling channels. In operation, the channel construction engine 110 may also provide the injection mold design that includes the constructed conformal cooling channels for physical manufacture through an additive manufacturing process.

These and other conformal cooling channel construction features and technical benefits are described in greater detail next.

Figure 2:
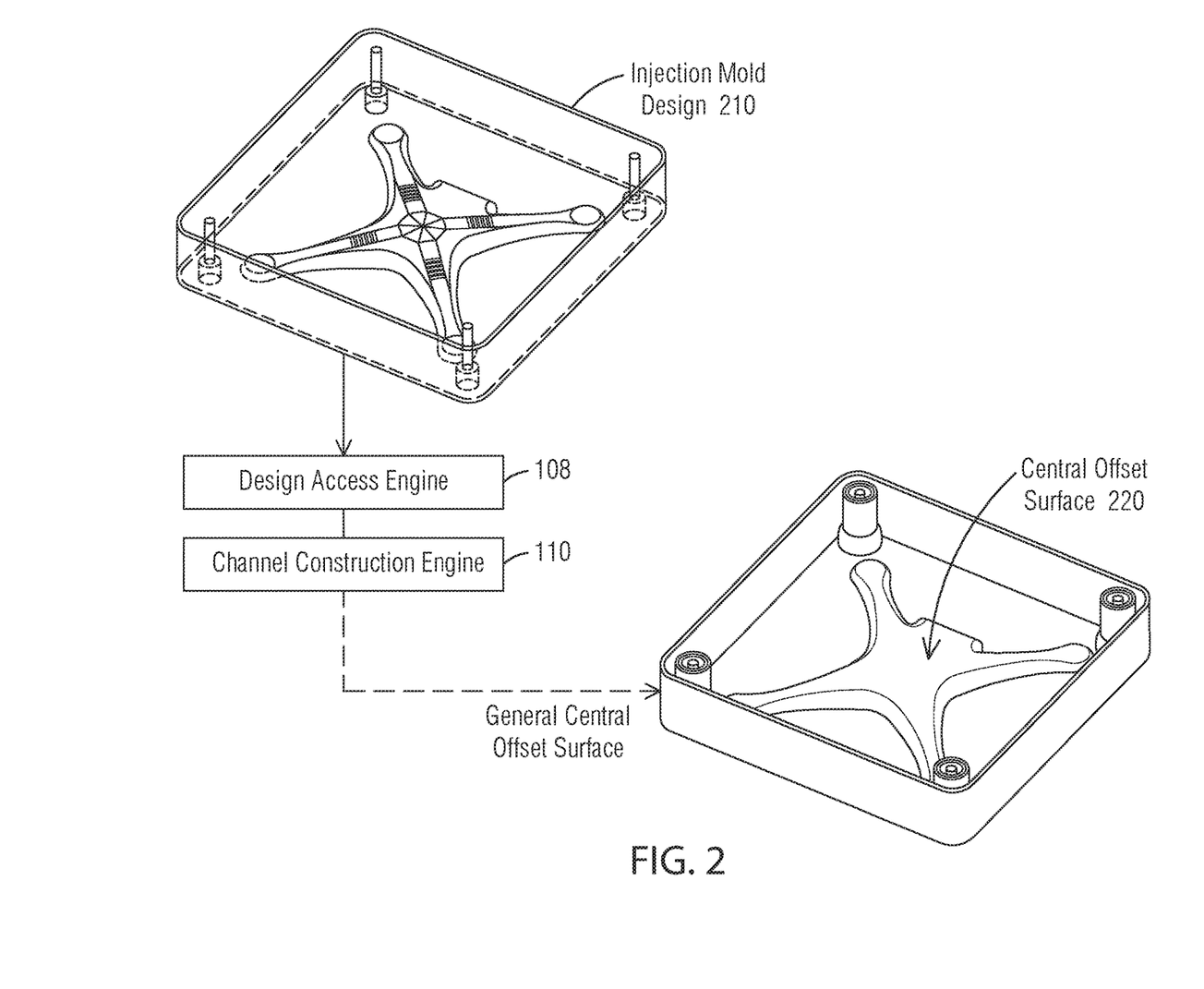
FIG. 2 shows an example generation of a central offset surface for construction of conformal cooling channels in an injection mold design.

FIG. 2 shows an example generation of a central offset surface for construction of conformal cooling channels in an injection mold design. In the example of FIG. 2, the design access engine 108 accesses an injection mold design 210. The injection mold design 210 may digitally represent an injection mold (or any portion thereof) in any suitable CAD format by which a physical structures, objects, or products may be digitally designed, tested, and validated. The injection mold design 210 may, for example, represent a particular mold piece of an injection mold. In that regard, the injection mold design 210 may include various surfaces that drive the shape and topology (at least in part) of solid products generated via the injection mold represented by the injection mold design 210.

In FIG. 2, the injection mold design 210 represents a mold piece that includes a lower surface that forms a portion of the injection space/cavity of an injection mold. In the particular example shown in FIG. 2, the injection mold design 210 defines an X-type surface shape with a 3D surface topology and various surface features that define and shape injected liquid plastic of injection mold productions. Nearly any 3D structure, topology, or shape can be defined by injection mold designs 210, e.g., via multiple mold pieces that together form an injection mold, including an internal cavity defined by internal mold piece surfaces when combined together to form the injection mold.

The channel construction engine 110 may support generation of conformal cooling channels for the injection mold design 210. One aspect of conformal cooling channels that promotes uniform cooling distribution for products manufactured via injection mold productions is uniform distancing between the cooling channels of an injection mold and product surfaces. To conform constructed cooling channels to the surface topology of a manufactured product, the channel construction engine 110 may generate a central offset surface for the injection mold design 210. A central offset surface may mirror, track, match, duplicate, or otherwise correlate to the surface topology, shape, or 3D structure of a product surface, and may thus form a representative topological surface or 3D geometry from which the channel construction engine 110 may construct conformal cooling channels.

In the example of FIG. 2, the channel construction engine 110 generates the central offset surface 220, which may match the 3D surface topology of a mold piece surface (and, in effect, a product surface generated vial the mold piece). To generate the central offset surface 220, the channel construction engine 110 may extract one or more mold surfaces from the injection mold design 210 and generate the central offset surface 220 with a same shape as that of the extracted mold surfaces. In some implementations, the channel construction engine 110 may extract a cooling surface from the injection mold design 210, and the cooling surface may correspond to specified portions (e.g., specified surfaces) of the injection mold design 210 to be cooled through conformal cooling channels.

The channel construction engine 110 may identify cooling surfaces in the injection mold design 210 in various ways. In some examples, the channel construction engine 110 may receive CAD application inputs that expressly identify the cooling surfaces in the injection mold design 210, for example as user-specified surface or portion selections for the injection mold design 210. As another example, the channel construction engine 110 may identify a predetermined portion of the injection mold design 210 as a cooling surface, such as a lower or internal mold piece surfaces or any surface portion of the injection mold design 210 which form a mold cavity in which liquid plastic will be injected into. In the example of FIG. 2, the channel construction engine 110 identifies a lower surface of the injection mold design 210 as a cooling surface, of which includes the X-shaped mold surface that defines product shapes for injection mold productions.

To extract a cooling surface of the injection mold design 210, the channel construction engine 110 may determine, obtain, or extricate a surface topology of any identified cooling surfaces. Such surface topologies may be used to define the shape of the central offset surface 220. The exact form of cooling surface extractions may vary based on the specific CAD representation that the injection mold design 210 is represented as, and the channel construction engine 110 may extract the surface topology, 3D structure, or any other geometric elements of the cooling surfaces, for example as CAD surfaces, a surface of meshed elements, NURBS representations, or any other form by which a CAD application may define a surface of a CAD object. The channel construction engine 110 may define the central offset surface in a consistent manner or form as the extracted cooling surfaces of the injection mold design 210. As seen in FIG. 2, the central offset surface 220 generated by the channel construction engine 110 has a consistent 3D shape as the inner surface of the injection mold design 210.

The extracted surface topology of cooling surfaces of the injection mold design 210 need not be completely identical to the actual cooling surfaces of the injected mold design 210. That is, the channel construction engine 110 may extract the same shape of the cooling surface as the general surface of the cooling surfaces without every precise surface feature and topological features, so long as the general 3D surface shape of the cooling surfaces are captured. Such extraction precision in surface topology extraction may be controlled via any number of configurable parameters, such as precision or feature size thresholds by which the channel construction engine 110 may determine to extract a general 3D shape and merged CAD faces instead of precise surface elements.

In some implementations, the channel construction engine 110 may construct a faceted surface mesh that approximates the 3D surface topology of the cooling surfaces. The channel construction engine 110 may identify the cooling surfaces of the injection mold design 210 and extract a CAD body of the injection mold design 210, doing so in any suitable manner. The channel construction engine 110 may merge any features smaller than a threshold size (e.g., dimensions) into CAD faces or part of the CAD body. As such, small holes, surface features, and other minor topological items may be smoothed, merged, or eliminated in extraction of the surface topology of the cooling surfaces of the injection mold design 210. The extracted surface topologies may have the same shape (as used herein), in that the extracted cooling surface used to generate offset surfaces is not completely identical (and topologically different with features merged into CAD faces), but approximates the topology of the cooling surfaces of the injection mold design 210.

Any degree of flexibility and customization for cooling surface extractions is contemplated herein. The channel construction engine 110 may generate the central offset surface 220 with a same shape as the cooling surfaces of the injection mold design 210. As noted herein, extraction precision of the cooling surfaces may be configurable, and the channel construction engine 110 may use the extracted surface topology of the cooling surfaces to define the central offset surface 220.

The channel construction engine 110 may position the central offset surface 220 at a central offset distance from the cooling surfaces. The central offset distance may refer to any configurable or computed value by which the channel construction engine 110 may distance conformal cooling channels from product surfaces in injection mold productions. For instance, the channel construction engine 110 may determine the central offset distance as a sum of a minimum distance specified between the cooling surface and conformal cooling channels and a radius value of the conformal cooling channels. Both the minimum distance and channel radius values may be user-specified, and thus the channel construction engine 110 may provide channel construction capabilities with increased flexibility and configurability.

In some sense, the central offset surface 220 may serve as a mirrored offset surface with a matching 3D surface topology as selected portions of the injection mold design 210 upon which conformal cooling channels can be constructed. The central offset surface 220 may be referred to as "central" in that cooling lines projected onto the central offset surface 220 can serve as center lines for eventually-constructed cooling channels. Example features with regards to cooling line projection onto central offset surfaces are discussed in greater detail next with reference to FIG. 3.

Figure 3:
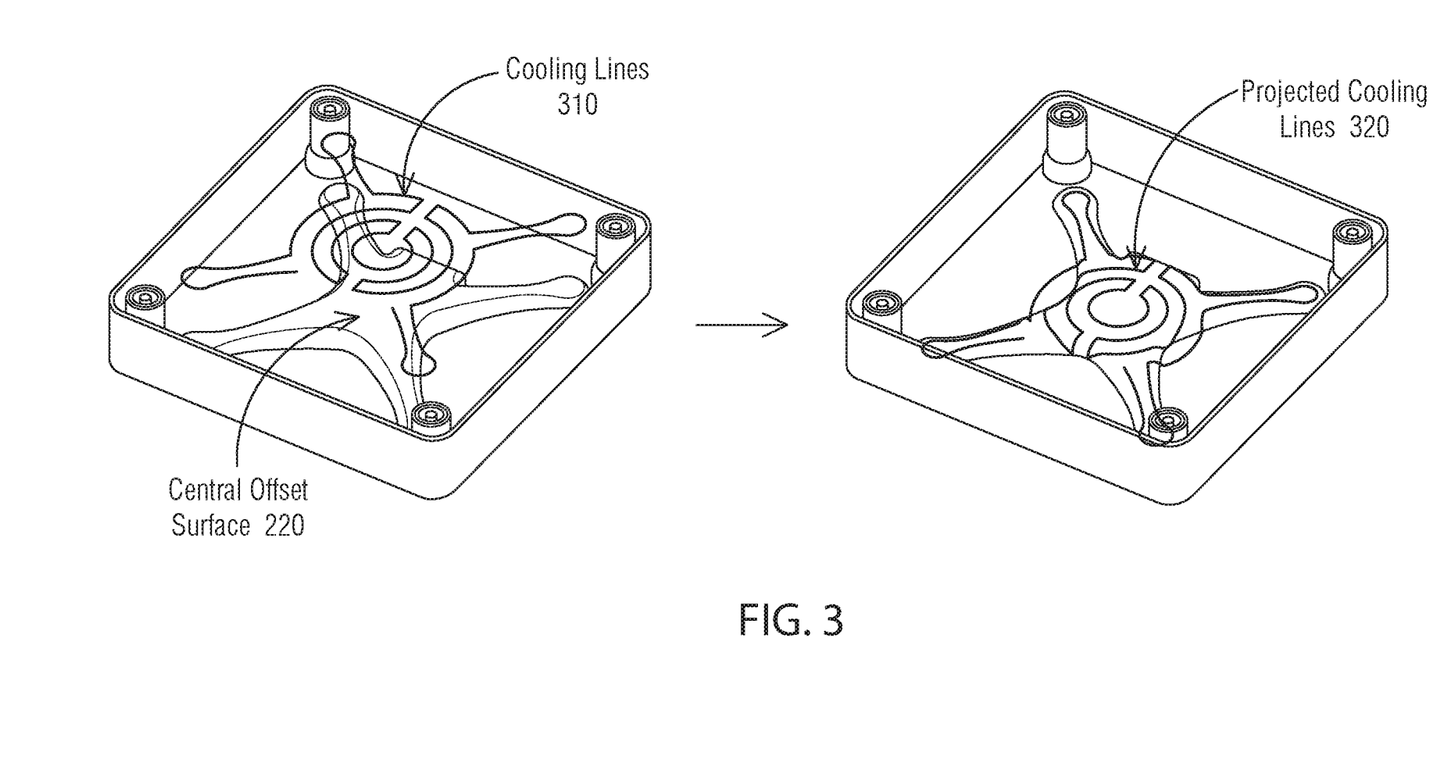
FIG. 3 shows an example projection of cooling lines onto a central offset surface of an injection mold design.

FIG. 3 shows an example projection of cooling lines onto a central offset surface of an injection mold design. The channel construction engine 110 may support design of conformal cooling channels through cooling lines. Cooling lines may serve as linear representations of cooling channels that the channel construction engine 110 may project onto central offset surfaces. As such, cooling lines may provide an elegant mechanism to configure, design, modify, or otherwise specify a layout of conformal cooling channels for an injection mold design. In terms of implementation, cooling lines may take the form of a collection of linear design elements in 2D or 3D design spaces.

For instance, the channel construction engine 110 may implement, access, or provide a cooling line library that includes any number of preconfigured cooling line designs that can be applied to an injection mold design. The cooling line designs of a cooling line library may be defined by 2D or 3D wireframe patterns, and can be configured with any number of design parameters, including distance parameters between cooling lines. As examples, patterns among the cooling line designs may include parallel line designs, half circle designs, full circle designs, spiral designs, and more. In other examples, cooling lines may be user-designed or user-specified, for example by through sketch capabilities that a CAD application may provide. Whether accessed from a design library or user input, the channel construction engine 110 may enforce line distance requirements such that the cooling lines accessed for an injection mold design are positioned at a uniform distance from one another (or within a uniform distance range). This uniform distance value between channels may be user-configured. In the example of FIG. 3, the channel construction engine 110 accesses the cooling lines 310, which may include a full circle design augmented with user-sketched extensions to cover the X-portions of a product design.

The channel construction engine 110 may project the cooling lines 310 onto the central offset surface 220, doing so via any number of line projection techniques. In particular, the channel construction engine 110 may project the cooling lines 310 (e.g., specified in a 2D plane) onto the 3D surface topology defined by the central offset surface 220. By doing so, the channel construction engine 110 may ensure that constructed cooling channels conform, match, or otherwise correlate to the surface topology of the injection mold design 210 (and thus the product shape of a manufactured product via injection mold production).

In some examples, the channel construction engine 110 may project cooling lines onto the central offset surface 220 through planar intersections. In these examples, the channel construction engine 110 may generate any number of planes that are normal (e.g., perpendicular) to the central offset surface 220, such as along a Z-axis in a 3D coordinate system that the central offset surface 220 is represented within. Then, the channel construction engine 110 may determine intersections between the generated planes and the central offset surface 220 as the projected cooling lines in construction of conformal cooling channels. In effect, cooling line projections through planar intersections of multiple parallel planes normal to the central offset surface 220 along a Z-axis may yield the same projected cooling lines as using a 2D cooling design comprised of parallel lines projected onto the central offset surface 220. The difference may be in how such projection is achieved, whether through 2D line projections on to a 3D surface or through planar intersections. Either way, the channel construction engine 110 may form projected cooling lines on the central offset surface 220.

In the example of FIG. 3, projecting of the cooling lines 310 onto the central offset surface 220 by the channel construction engine 110 forms the projected cooling lines 320. Through such projection of cooling lines 310 onto the central offset surface 220, the channel construction engine 110 may ensure distance uniformity for the projected cooling lines 320, including uniform distances between the projected cooling lines 320 (as enforced for cooling line designs) and a uniform distance between the projected cooling lines 320 and the cooling surfaces of the injection mold design 210.

The channel construction engine 110 may implement or support modifications to the projected cooling lines 320 in any number of ways. As line projection may result in incomplete or undesired line features in channel designs, the channel construction engine 110 may provide edit capabilities to allow custom modifications to the projected cooling lines 320. Example modification tools by which the channel construction engine 110 may support editing of the projected cooling lines 320 include line trim, extend, divide, bridge, move, and drag operations. Through such curve editing tools, the channel construction engine 110 may trim or extend a projected cooling line 320 if it is a deemed too long or too short, divided into multiple projected cooling lines, bridged in the natural flow direction of the projected cooling line(s), or otherwise moved or modified. As such, the channel construction engine 110 may provide flexible modification capabilities in the design of conformal cooling channels.

As a particular modification to the projected cooling lines 320, the conformal cooling channel technology described herein may support the detection and smoothing of sharp portions, example features of which are described next with reference to FIG. 4.

Figure 4:
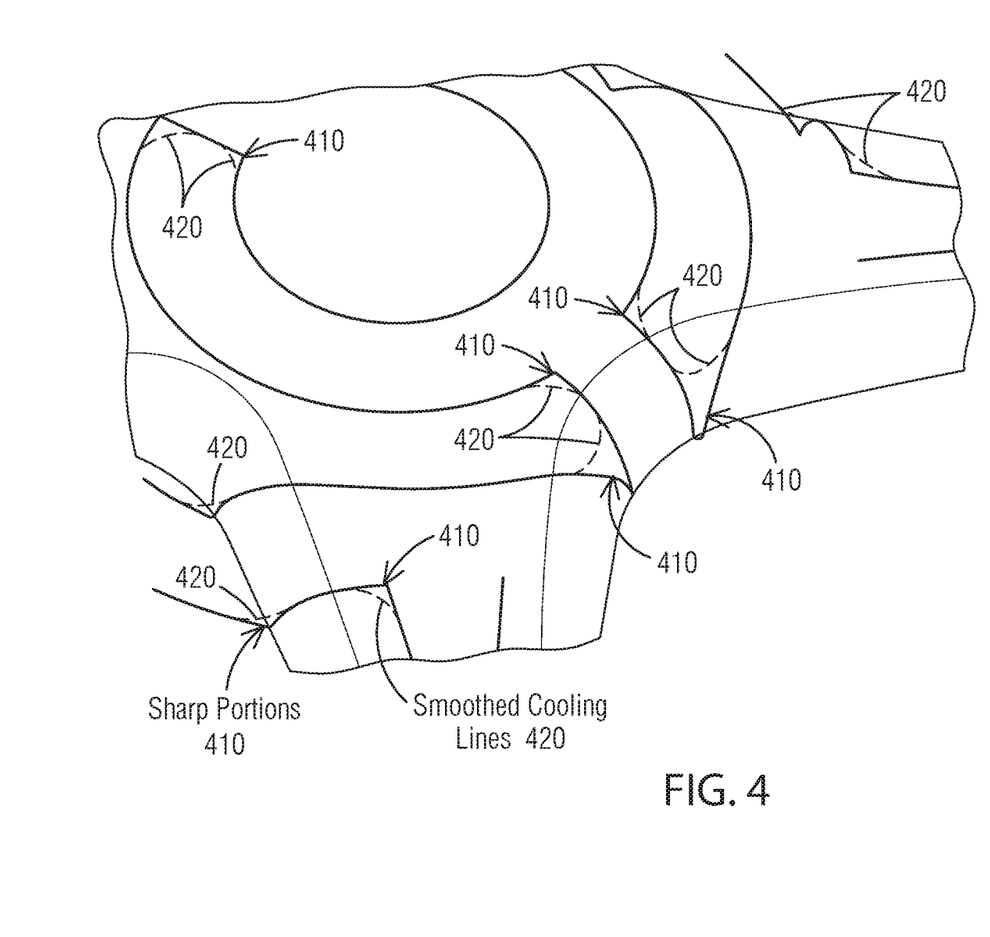
FIG. 4 shows an example smoothing of sharp portions of projected cooling lines of an injection mold design.

FIG. 4 shows an example smoothing of sharp portions of projected cooling lines of an injection mold design. Projection of cooling lines (for example designed in a 2D plane) onto a 3D surface topology of central offset surface may result in sharp transitions or corners. This may be the case as 2D cooling lines with smooth transitions and line bends with relatively lower curvature projected onto the 3D surface topology of the central offset surface can cause the curvature of the projected cooling lines can bend sharply or have higher curvatures. Cooling channels with sharp bends, corners, or high-curvature may reduce cooling performance in injection mold productions. Such high-curvature designs may not be feasibly manufactured via 3D printing, and high curvature portions of conformal cooling channels may restrict coolant flow to limit the efficacy of injection mold cooling processes.

To address such issues, the channel construction engine 110 may detect and smooth sharp portions of projected cooling lines. In the example of FIG. 4, the channel construction engine 110 detects various sharp portions 410 of the projected cooling lines 320 and smooths the sharp portions 410 to form smoothed cooling lines 420. In detecting the sharp portions 410, the channel construction engine 110 may apply any number of sharpness criteria, which may refer to any condition or threshold by which the channel construction engine 110 determines sharp portions for projected cooling lines. The sharpness criteria may, in effect, define what constitutes sharp portions in projected cooling lines, doing so in any suitable way. For example, the channel construction engine 110 may apply sharpness criteria that include curvature thresholds. A curvature threshold may specify a degree or range of tolerable thresholds (or vice versa curvature thresholds or ranges that, if surpassed, constitute sharp portions). As such, the channel construction engine 110 may detect the sharp portions 410 of the projected cooling lines 320 as curve portions of the projected cooling lines 320 with a curvature value that exceeds the curvature threshold.

The channel construction engine 110 may determine curvature values for the projected cooling lines 320 in any number ways, for example by determining a circle of best fit for discrete points along the projected cooling lines 320. The channel construction engine 110 may measure the curvature as a radius value for the determined circle of best fit, and in such cases, the channel construction engine 110 may detect the sharp portions 410 of the projected cooling lines 320 as curve portions of the projected cooling lines 320 with a curvature that is less than a radius value of the conformal cooling channels (or by any other function of the computed curvature values of projected cooling lines 320 based on a radius or other size or measurement value of conformal cooling channels for the injection mold design 210). While some examples are presented herein, the channel construction engine 110 may apply sharpness criteria in any number of forms in order to determine sharp portions 410 of the projected cooling channels 320.

The channel construction engine 110 may smooth the detected sharp portions 410 of the projected cooling lines 320. In doing so, the channel construction engine 110 may modify the sharp portions 410 of the projected cooling lines 320 so as to no longer be identified as sharp portions according to the sharpness criteria. In that regard, the channel construction engine 110 may replace the sharp portions 410 of the projected cooling lines 320 with smoothed portions. In modifying the sharp portions 410, the channel construction engine 110 may apply any number of spline-based smoothing processes. As another example, the channel construction engine 110 may perform bridging operations between the sharp portions 410 and neighboring portions of the projected cooling lines 320 in order to smooth the sharp portions 410. Through any suitable line-smoothing process applied by the channel construction engine 110 for the sharp portions 410, the channel construction engine 110 may form smooth cooling lines, such as the smoothed cooling lines 420 shown in FIG. 4.

The smoothed cooling lines 420 generated by the channel construction engine 110 may form a basis from which the channel construction engine 110 constructs conformal cooling channels. In particular, the smoothed cooling lines 420 may form a center line for cooling channels, and the channel construction engine 110 may generate conformal cooling lines for an injection mold design 210 using the smoothed cooling lines 420 projected along the central offset surface 220 as a center line for the conformal cooling channels. The channel construction engine 110 may form conformal cooling channels from the smoothed cooling lines 420 by forming a 3D shape (e.g., a circular or tubular channel) along the path specified by the smoothed cooling lines 420. The constructed conformal cooling channels may thus be circular tubes (e.g. forming a 3D circular shape along the smoothed cooling lines 420), rectangular or hexagonal-shaped conformal cooling channels, or channels formed according to any other configurable shape. The channel construction engine 110 may thus construct conformal cooling channels for injection mold designs.

Figure 5:
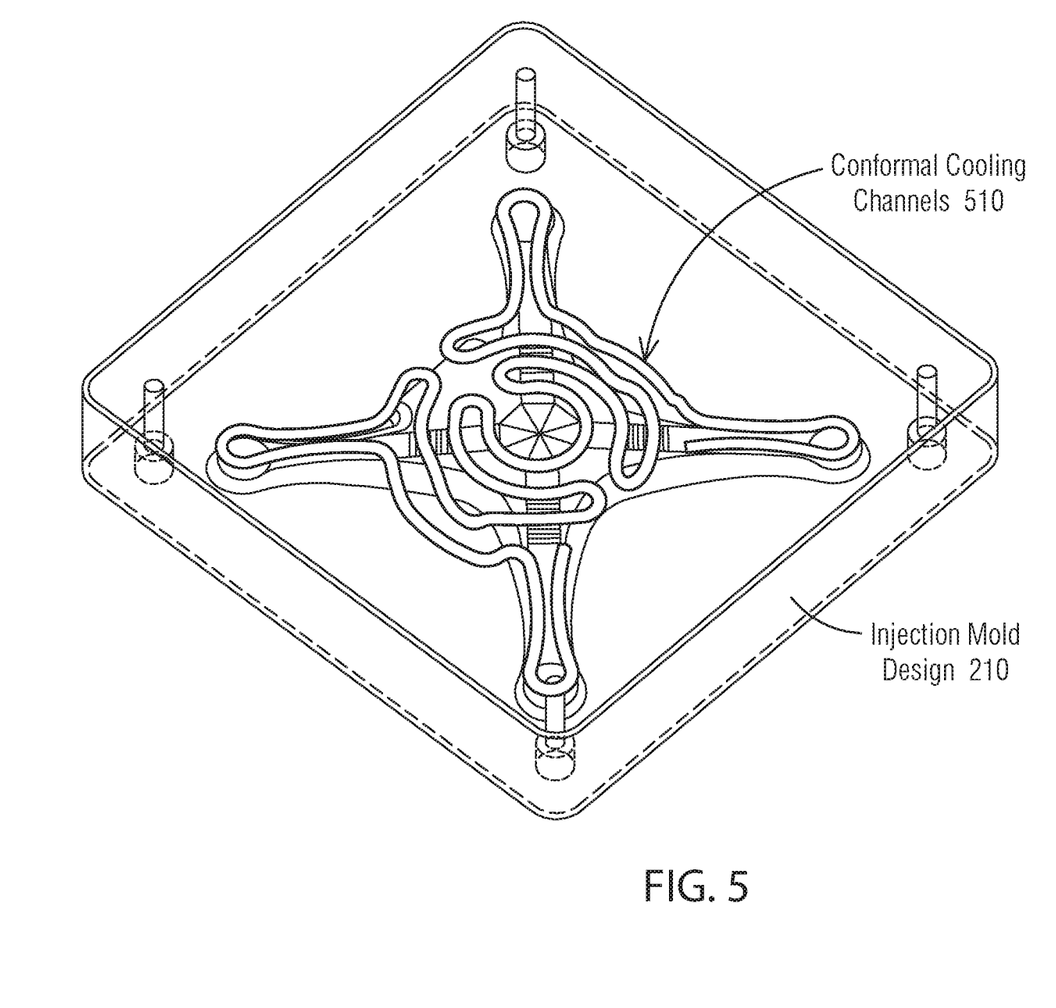
FIG. 5 shows an example of an injection mold design that includes conformal cooling channels constructed according to the present disclosure.

FIG. 5 shows an example of an injection mold design 210 that includes conformal cooling channels constructed according to the present disclosure. In particular, the example of FIG. 5 includes conformal cooling channels 510 that the channel construction engine 110 may generate from smoothed cooling lines 420. The conformal cooling channels 510 may be uniform distance from another as the channel construction engine 110 may enforce distance uniformity for the cooling lines 310 that form a layout of the conformal cooling channels 510. The conformal cooling channels 510 may also exhibit distance uniformity from an underlying product surface, as the projected cooling lines 320 from which the conformal cooling channels 510 are constructed may be uniform in distance from cooling surfaces of the injection mold design 210. Moreover, the conformal cooling channels 510 may have curvatures that do not include sharp corners or bends, as such sharp portions may be addressed via sharp portion detection and smoothing processes performed by the channel construction engine 110.

As such, the conformal cooling channels 510 shown in FIG. 5 may be constructed according to any of the various features of the conformal channel construction technology presented herein, and may thus be generated with increased efficiency, effectiveness, and quality. In some implementations, the channel construction engine 110 may validate conformal cooling channels, example features of which are described next with reference to FIG. 6.

Figure 6:
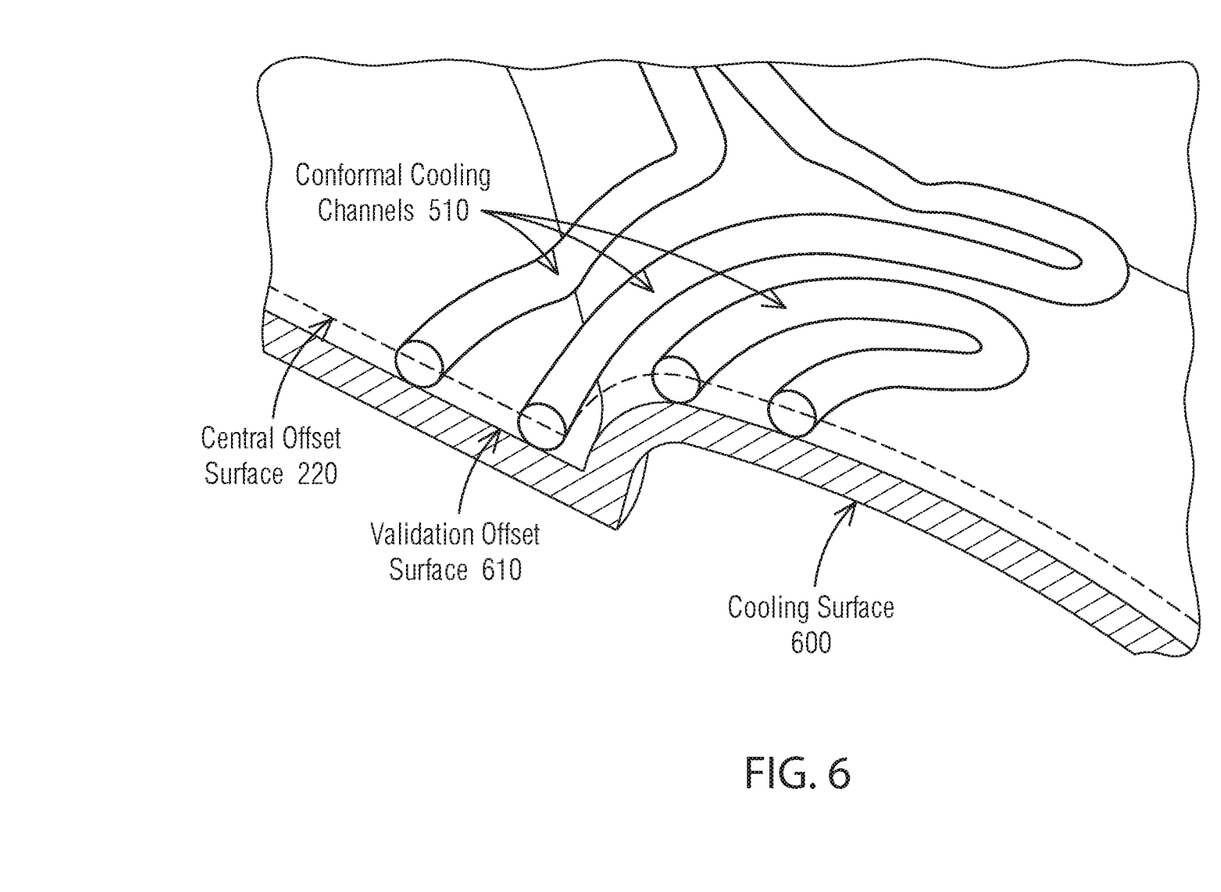
FIG. 6 shows an example validation of conformal cooling channels through a validation offset surface.

FIG. 6 shows an example validation of conformal cooling channels through a validation offset surface. As an example form of validation, the channel construction engine 110 may ensure that constructed conformal cooling channels are at least a minimum distance from injection mold surfaces (e.g., cooling surfaces specified for an injection mold design 210). In performing such validations, the channel construction engine 110 may generate and utilize validation offset surfaces. To illustrate through FIG. 6, the channel construction engine 110 may validate conformal cooling channels 510 generated for an injection mold design 210 and positioned at a distance from a cooling surface 600 of the injection mold design 210. Illustrated in FIG. 6 is a central offset surface 220, which may be generated and used in the construction of the conformal cooling channels 510 in various ways as described herein. As can be seen from the cross-section in FIG. 6, the central offset surface 220 may match the surface topology of the cooling surface 600.

To validate the conformal cooling channels 510, the channel construction engine 110 may generate a validation offset surface 610 with a same shape as the cooling surface 600 and positioned at a validation offset distance from the cooling surface 600. The validation offset distance may be a minimum distance specified between the cooling surface 600 and the conformal cooling channels 510, and thus any portion of the conformal cooling channels that extends past the validation offset surface 610 may represent a violation of the minimum distance threshold set between the conformal cooling channels 510 and a product surface (as represented via the cooling surface 600).

Thus, the channel construction engine 110 may determine a design violation for the conformal cooling channels 510 has occurred responsive to a determination that any portion of the conformal cooling channels 510 extends past the validation offset surface 610 towards the cooling surface 600. In some implementations, the validation offset surface 610 may provide a visual indication of such design violations, as any portion of the conformal cooling channels 510 that visibly extend beyond or past the validation offset surface 610 can be ascertained as design violations.

Such design violations may occur, for example, when user-based modifications or other processing of the conformal cooling channels 510 (or underlying projected cooling lines 320 or smoothed cooling lines 420) result in adjustments to the conformal cooling channels 510 that cause the minimum distance threshold to be violated. Through the validation offset surface 610, the channel construction engine 110 may provide an effective and efficient mechanism to identify, flag, and support resolution of such channel design violations.

While many conformal cooling channel construction features have been described herein through illustrative examples presented through various figures, the design access engine 108 or the channel construction engine 110 may implement any combination of the conformal cooling channel construction technology described herein.

Figure 7:
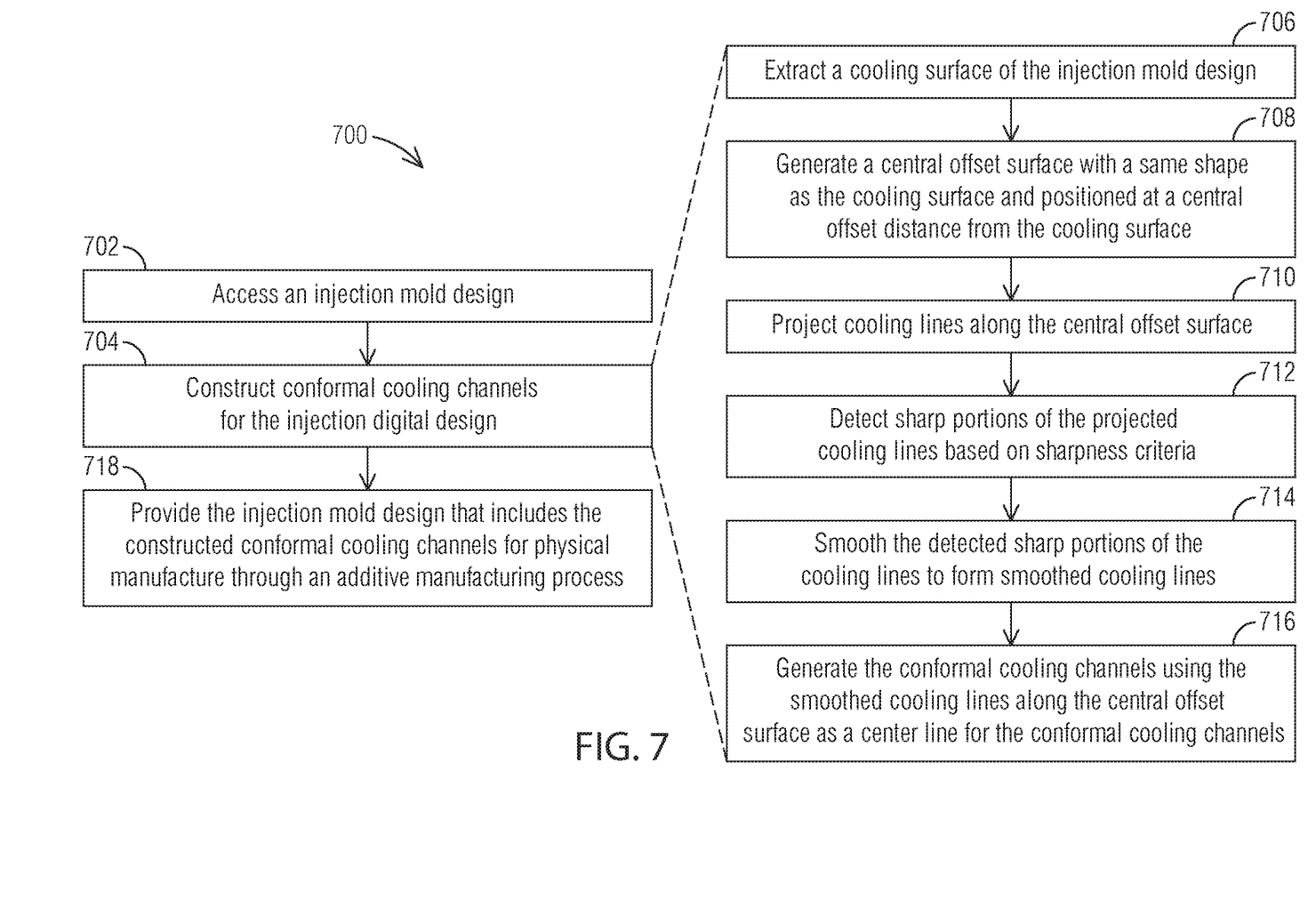
FIG. 7 shows an example of logic that a system may implement to support construction of conformal cooling channels for injection mold designs.

FIG. 7 shows an example of logic 700 that a system may implement to support construction of conformal cooling channels for injection mold designs. For example, the computing system 100 may implement the logic 700 as hardware, executable instructions stored on a machine-readable medium, or as a combination of both. The computing system 100 may implement the logic 700 via the design access engine 108 and the channel construction engine 110, through which the computing system 100 may perform or execute the logic 700 as a method to support conformal cooling channel construction. The following description of the logic 700 is provided using the design access engine 108 and the channel construction engine 110 as examples. However, various other implementation options by computing systems are possible.

In implementing the logic 700, the design access engine 108 may access an injection mold design (702). In implementing the logic 700, the channel construction engine 110 may construct conformal cooling channels for the injection mold design (704). The channel construction engine 110 may do so by extracting a cooling surface of the injection mold design (706), generating a central offset surface with a same shape as the cooling surface and positioned at a central offset distance from the cooling surface (708), and projecting cooling lines along the central offset surface (710). The channel construction engine 110 may further construct the conformal cooling channels by detecting sharp portions of the projected cooling lines based on sharpness criteria (712), smoothing the detected sharp portions of the projected cooling lines to form smoothed cooling lines (714), and generating the conformal cooling channels using the smoothed cooling lines along the central offset surface as a center line for the conformal cooling channels (716).

In implementing the logic 700, the channel construction engine 110 may also provide the injection mold design that includes the constructed conformal cooling channels for physical manufacture through an additive manufacturing process (718). For example, the channel construction engine 110 may transmit the injection mold design to a 3D printer for manufacture, or to various CAE systems for design analysis and simulation. In some implementations, the channel construction engine 110 itself may include hardware to implement or perform 3D printing, and may thus physically manufacture the injection mold design. Through any such features, the channel construction engine 110 may support physical manufacture of the injection mold designs with conformal cooling channels constructed according to the present disclosure.

The logic 700 shown in FIG. 7 provides an illustrative example by which a computing system 100 may support construction of conformal cooling channels for injection mold designs. Additional or alternative steps in the logic 700 are contemplated herein, including according to any of the various features described herein for the design access engine 108, the channel construction engine 110, or any combinations thereof.

Figure 8:
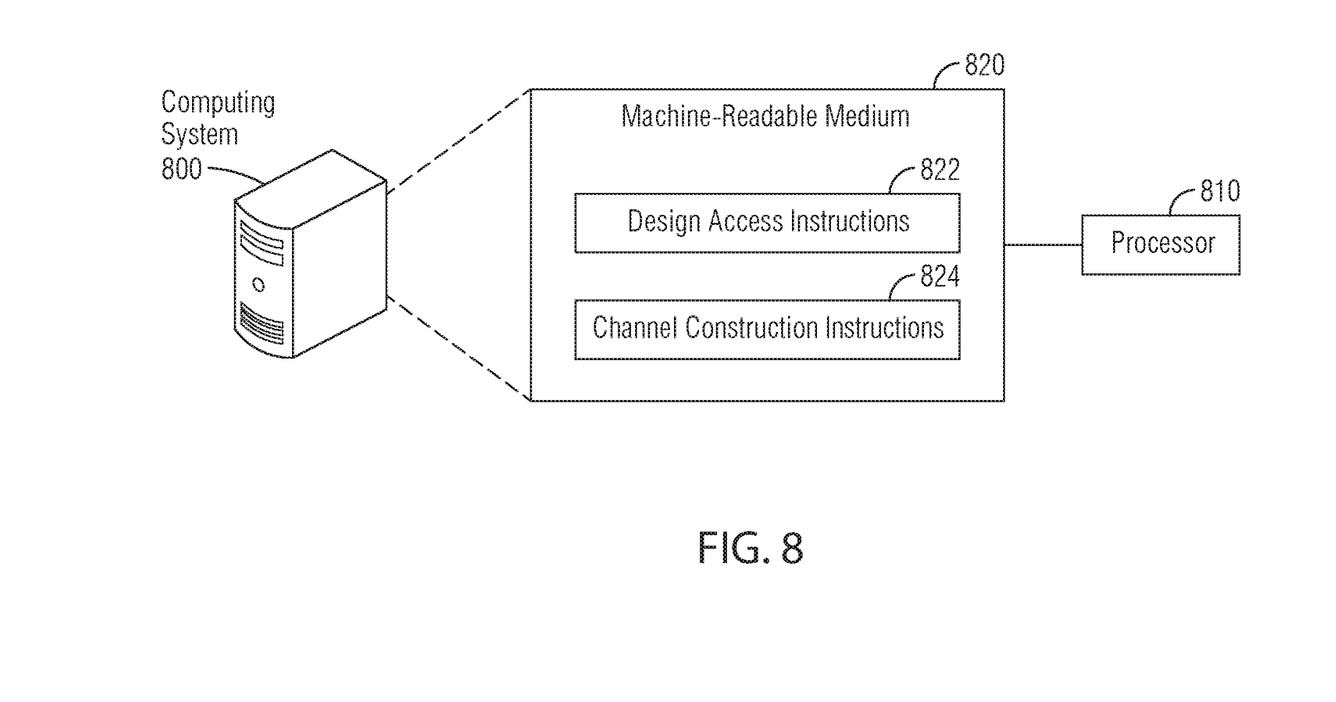
FIG. 8 shows an example of a computing system that supports construction of conformal cooling channels for injection mold designs.

FIG. 8 shows an example of a computing system 800 that supports construction of conformal cooling channels for injection mold designs. The computing system 800 may include a processor 810, which may take the form of a single or multiple processors. The processor(s) 810 may include a central processing unit (CPU), microprocessor, or any hardware device suitable for executing instructions stored on a machine-readable medium. The computing system 800 may include a machine-readable medium 820. The machine-readable medium 820 may take the form of any non-transitory electronic, magnetic, optical, or other physical storage device that stores executable instructions, such as the design access instructions 822 and the channel construction instructions 824 shown in FIG. 8. As such, the machine-readable medium 820 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 800 may execute instructions stored on the machine-readable medium 820 through the processor 810. Executing the instructions (e.g., the design access instructions 822 and/or the channel construction instructions 824) may cause the computing system 800 to perform any of the conformal cooling channel construction features described herein, including according to any of the features of the design access engine 108, the channel construction engine 110, or combinations of both.

For example, execution of the design access instructions 822 by the processor 810 may cause the computing system 800 to access an injection mold design. Execution of the channel construction instructions 824 by the processor 810 may cause the computing system 800 to construct conformal cooling channels for the injection mold design, including by extracting a cooling surface of the injection mold design (wherein the cooling surface may correspond to specified portions of the injection mold design to be cooled through the conformal cooling channels), generating a central offset surface with a same shape as the cooling surface and positioned at a central offset distance from the cooling surface, and projecting cooling lines on to the central offset surface. Execution of the channel construction instructions 824 may cause the computing system 800 to construct conformal cooling channels further by detecting sharp portions of the projected cooling lines based on sharpness criteria, smoothing the detected sharp portions of the projected cooling lines to form smoothed cooling lines, and generating the conformal cooling channels using the smoothed cooling lines along the central offset surface as a center line for the conformal cooling channels. Execution of the channel construction instructions 824 by the processor 810 may also cause the computing system 800 to provide the injection mold design that includes the constructed conformal cooling channels for physical manufacture through an additive manufacturing process.

Any additional or alternative conformal cooling channel construction features as described herein may be implemented via the design access instructions 822, channel construction instructions 824, or a combination of both.

The systems, methods, devices, and logic described above, including the design access engine 108 and the channel construction engine 110, may be implemented in many different ways in many different combinations of hardware, logic, circuitry, and executable instructions stored on a machine-readable medium. For example, the design access engine 108, the channel construction engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the design access engine 108, the channel construction engine 110, or combinations thereof.

The processing capability of the systems, devices, and engines described herein, including the design access engine 108 and the channel construction engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
by a computing system:
  accessing an injection mold design;
  constructing conformal cooling channels for the injection mold design, including by:
    extracting a cooling surface of the injection mold design, wherein the cooling surface corresponds to specified portions of the injection mold design to be cooled through the conformal cooling channels;
    generating a central offset surface positioned at a central offset distance from the cooling surface;
    projecting cooling lines on to the central offset surface;
    detecting sharp portions of the projected cooling lines based on sharpness criteria;
    smoothing the detected sharp portions of the projected cooling lines to form smoothed cooling lines; and
    generating the conformal cooling channels using the smoothed cooling lines along the central offset surface as a center line for the conformal cooling channels; and
  providing the injection mold design that includes the constructed conformal cooling channels for physical manufacture to physically manufacture the injection mold design through an additive manufacturing process.

2. The method of claim 1, further comprising determining the central offset distance as a sum of a minimum distance specified between the cooling surface and the conformal cooling channels and a radius value of the conformal cooling channels.

3. The method of claim 1, further comprising validating the conformal cooling channels constructed for the injection mold design, including by:
  generating a validation offset surface positioned at a validation offset distance from the cooling surface; and
  determining a design violation for the conformal cooling channels has occurred responsive to a determination that any portion of the conformal cooling channels extends past the validation offset surface towards the cooling surface.

4. The method of claim 3, wherein the validation offset distance is a minimum distance specified between the cooling surface and the conformal cooling channels.

5. The method of claim 1, wherein the sharpness criteria comprise a curvature threshold, and
  comprising detecting the sharp portions of the projected cooling lines as curve portions of the projected cooling lines with a curvature value that exceeds the curvature threshold.

6. The method of claim 1, comprising detecting the sharp portions of the projected cooling lines as curve portions of the projected cooling lines with a curvature that is less than a radius value of the conformal cooling channels.

7. The method of claim 1, comprising smoothing the detected sharp portions of the projected cooling lines through a spline-based smoothing process.

8. A system comprising:
a processor; and
a non-transitory machine-readable medium comprising instructions that, when executed by the processor, cause a computing system to:
  construct conformal cooling channels for the injection mold design, including by:
    extracting a cooling surface of the injection mold design, wherein the cooling surface corresponds to specified portions of the injection mold design to be cooled through the conformal cooling channels;

generating a central offset surface positioned at a central offset distance from the cooling surface;

projecting cooling lines on to the central offset surface;

detecting sharp portions of the projected cooling lines based on sharpness criteria;

smoothing the detected sharp portions of the projected cooling lines to form smoothed cooling lines; and generating the conformal cooling channels using the smoothed cooling lines along the central offset surface as a center line for the conformal cooling channels; and provide the injection mold design that includes the constructed conformal cooling channels for physical manufacture to physically manufacture the injection mold design through an additive manufacturing process.

9. The system of claim 8, wherein the channel construction engine is further configured to the instructions, when executed, cause the computing system further to determine the central offset distance as a sum of a minimum distance specified between the cooling surface and the conformal cooling channels and a radius value of the conformal cooling channels.

10. The system of claim 8, wherein the channel construction engine is further configured to the instructions, when executed, cause the computing system further to validate the conformal cooling channels constructed for the injection mold design, including by:

generating a validation offset surface positioned at a validation offset distance from the cooling surface; and determining a design violation for the conformal cooling channels has occurred responsive to a determination that any portion of the conformal cooling channels extends past the validation offset surface towards the cooling surface.

11. The system of claim 10, wherein the validation offset distance is a minimum distance specified between the cooling surface and the conformal cooling channels.

12. The system of claim 8, wherein the sharpness criteria comprise a curvature threshold, and wherein the channel construction engine is configured to the instructions, when executed, cause the computing system further to detect the sharp portions of the projected cooling lines as curve portions of the projected cooling lines with a curvature value that exceeds the curvature threshold.

13. The system of claim 8, wherein the channel construction engine is configured to the instructions, when executed, cause the computing system further to detect the sharp portions of the projected cooling lines as curve portions of the projected cooling lines with a curvature that is less than a radius value of the conformal cooling channels.

14. The system of claim 8, wherein the channel construction engine is configured to the instructions, when executed, cause the computing system further to smooth the detected sharp portions of the projected cooling lines through a spline-based smoothing process.

15. A non-transitory machine-readable medium comprising instructions that, when executed by a processor, cause a computing system to:

access an injection mold design;

construct conformal cooling channels for the injection mold design, including by:

extracting a cooling surface of the injection mold design, wherein the cooling surface corresponds to specified portions of the injection mold design to be cooled through the conformal cooling channels;

generating a central offset surface positioned at a central offset distance from the cooling surface;

projecting cooling lines on to the central offset surface;

detecting sharp portions of the projected cooling lines based on sharpness criteria;

smoothing the detected sharp portions of the projected cooling lines to form smoothed cooling lines; and generating the conformal cooling channels using the smoothed cooling lines along the central offset surface as a center line for the conformal cooling channels; and provide the injection mold design that includes the constructed conformal cooling channels for physical manufacture to physically manufacture the injection mold design through an additive manufacturing process.

16. The non-transitory machine-readable medium of claim 15, wherein the instructions, when executed, cause the computing system to determine the central offset distance as a sum of a minimum distance specified between the cooling surface and the conformal cooling channels- and a radius value of the conformal cooling channels.

17. The non-transitory machine-readable medium of claim 15, wherein the instructions, when executed, cause the computing system to validate the conformal cooling channels constructed for the injection mold design, including by:

generating a validation offset surface positioned at a validation offset distance from the cooling surface; and determining a design violation for the conformal cooling channels has occurred responsive to a determination that any portion of the conformal cooling channels extends past the validation offset surface towards the cooling surface.

18. The non-transitory machine-readable medium of claim 17, wherein the validation offset distance is a minimum distance specified between the cooling surface and the conformal cooling channels.

19. The non-transitory machine-readable medium of claim 15, wherein the sharpness criteria comprise a curvature threshold and wherein the instructions, when executed, cause the computing system to detect the sharp portions of the projected cooling lines as curve portions of the projected cooling lines with a curvature value that exceeds the curvature threshold.

20. The non-transitory machine-readable medium of claim 15, wherein the instructions, when executed, cause the computing system to detect the sharp portions of the projected cooling lines as curve portions of the projected cooling lines with a curvature that is less than a radius value of the conformal cooling channels.

* * * * *